United States Patent
Tagashira

(10) Patent No.: US 8,689,014 B2
(45) Date of Patent: Apr. 1, 2014

(54) DATA ENCRYPTION DEVICE AND CONTROL METHOD THEREOF

(75) Inventor: Nobuhiro Tagashira, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 13/098,629

(22) Filed: May 2, 2011

(65) Prior Publication Data

US 2011/0293087 A1 Dec. 1, 2011

(30) Foreign Application Priority Data

May 27, 2010 (JP) .................................. 2010-121772

(51) Int. Cl.
*G06F 21/00* (2013.01)
(52) U.S. Cl.
USPC ........................................ 713/193; 713/189
(58) Field of Classification Search
USPC ................................. 713/193, 189
See application file for complete search history.

(56) References Cited

U.S. PATENT DOCUMENTS

| | | | |
|---|---|---|---|
| 7,889,863 B2* | 2/2011 | Harada et al. | 380/201 |
| 2002/0057799 A1* | 5/2002 | Kohno | 380/228 |
| 2002/0126839 A1* | 9/2002 | Haque et al. | 380/37 |
| 2002/0136400 A1* | 9/2002 | Askerov et al. | 380/28 |
| 2002/0159599 A1* | 10/2002 | Matsui et al. | 380/263 |
| 2003/0026430 A1* | 2/2003 | Aikawa et al. | 380/277 |
| 2005/0078825 A1* | 4/2005 | Ohmori et al. | 380/255 |
| 2005/0149736 A1* | 7/2005 | Kim | 713/177 |
| 2006/0071824 A1* | 4/2006 | Kim et al. | 341/50 |
| 2006/0114785 A1* | 6/2006 | Ohgose et al. | 369/53.2 |
| 2006/0239459 A1* | 10/2006 | Yamamichi et al. | 380/255 |
| 2007/0121933 A1* | 5/2007 | Futa et al. | 380/1 |
| 2007/0140478 A1* | 6/2007 | Komano et al. | 380/28 |
| 2007/0189738 A1* | 8/2007 | Sato | 386/131 |
| 2007/0198859 A1* | 8/2007 | Harada et al. | 713/193 |
| 2007/0258587 A1* | 11/2007 | Harada et al. | 380/201 |
| 2007/0274179 A1* | 11/2007 | Ito et al. | 369/47.12 |
| 2007/0283442 A1* | 12/2007 | Nakano et al. | 726/26 |
| 2008/0080706 A1* | 4/2008 | Ikeuchi et al. | 380/1 |
| 2008/0144809 A1* | 6/2008 | Okubo et al. | 380/28 |

* cited by examiner

*Primary Examiner* — Bradley Holder
(74) *Attorney, Agent, or Firm* — Canon USA, Inc., IP Division

(57) ABSTRACT

In an encryption device, in a case where predetermined first data is input, the first data is converted into second data that is data decrypted from the first data and, in a case where the second data is input, the second data is converted into the first data, and the converted data is encrypted to be output to a storage unit.

6 Claims, 7 Drawing Sheets

FIG. 3A

| PRE-CONVERSION DATA | POST-CONVERSION DATA |
|---|---|
| 0000...00 | ed74...97 |
| ed74...97 | 0000...00 |

FIG. 3B

| |
|---|
| 0000...00 |
| ed74...97 |

FIG. 3C

| PRE-CONVERSION DATA | POST-CONVERSION DATA |
|---|---|
| 0000...00 | ed74...97 |
| ed74...97 | 0000...00 |
| 1111...11 | 3753...46 |
| 3753...46 | 1111...11 |

FIG. 3D

| | |
|---|---|
| 0000...00 | 1111...11 |
| ed74...97 | 3753...46 |

FIG. 3E

| PRE-CONVERSION DATA | POST-CONVERSION DATA |
|---|---|
| 0000...00 | 7175...21 |
| 7175...21 | 0000...00 |

FIG. 3F

| |
|---|
| 0000...00 |
| 7175...21 |

DATA ENCRYPTION DEVICE AND CONTROL METHOD THEREOF

BACKGROUND OF THE INVENTION

1. Field of the Invention

The present invention relates to a technique for encrypting data.

2. Description of the Related Art

Conventionally, a technique is known in which, in order to store sensitive information in a storage device in the form of electronic data, the important data is encrypted by using a predetermined encryption algorithm to store the encrypted important data in the storage device. Another technique is also known in which, in a case of, for example, discarding the storage device, the important data is overwritten and stored with a predetermined data (e.g., a data string including only zeros) in order for the important data stored in the storage device not to be read out any more.

For example, all the pieces of data to be input are considered as the important data and therefore, a user considers to store the important data in the storage device after surely encrypting it. In the case, it is desirable to constitute a system such that the important data input in a device is always processed through an encryption processing unit before it is stored.

However, in the above described system, if the user attempts to overwrite the important data with the predetermined data (hereinafter, referred to as the "fixed data") and store thereof, since the fixed data is also stored in the storage device after it is encrypted, a purpose of "overwriting and storing data by using the fixed data" is not achieved.

An example of simpler method includes a system in which the fixed data bypasses the encryption processing unit only in a case of the fixed data. However, in this case, data that can be acquired by the encryption by the encryption processing unit is identical to the fixed data may be generated. Therefore, the data cannot be discriminated whether the data is acquired by overwriting it by using the fixed data or the data is acquired by encrypting the data. Accordingly, data acquired by encryption by using the encryption processing unit and identical to the fixed data cannot be correctly decrypted.

SUMMARY OF THE INVENTION

The present invention is directed to a data encryption device and a control method thereof capable of overwriting data with predetermined data while the data is processed through an encryption processing unit and correctly decrypting data identical to predetermined data by an encryption.

In accordance with one aspect of the present invention a data encryption device includes a conversion unit configured to convert input data and an encryption unit configured to encrypt the converted data and output the encrypted data to a storage unit, wherein, in a case where predetermined first data is input, the conversion unit converts the first data into second data decrypted by an encryption algorithm of the encryption unit, whereas, in a case where the second data is input, the conversion unit converts the second data into the first data, and output the converted data to the encryption unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A, 3B, 3C, 3D, 3E, and 3F, respectively, illustrate examples of table information.

DESCRIPTION OF THE EMBODIMENTS

Various exemplary embodiments, features, and aspects of the invention will be described in detail below with reference to the drawings.

Figure 1A:
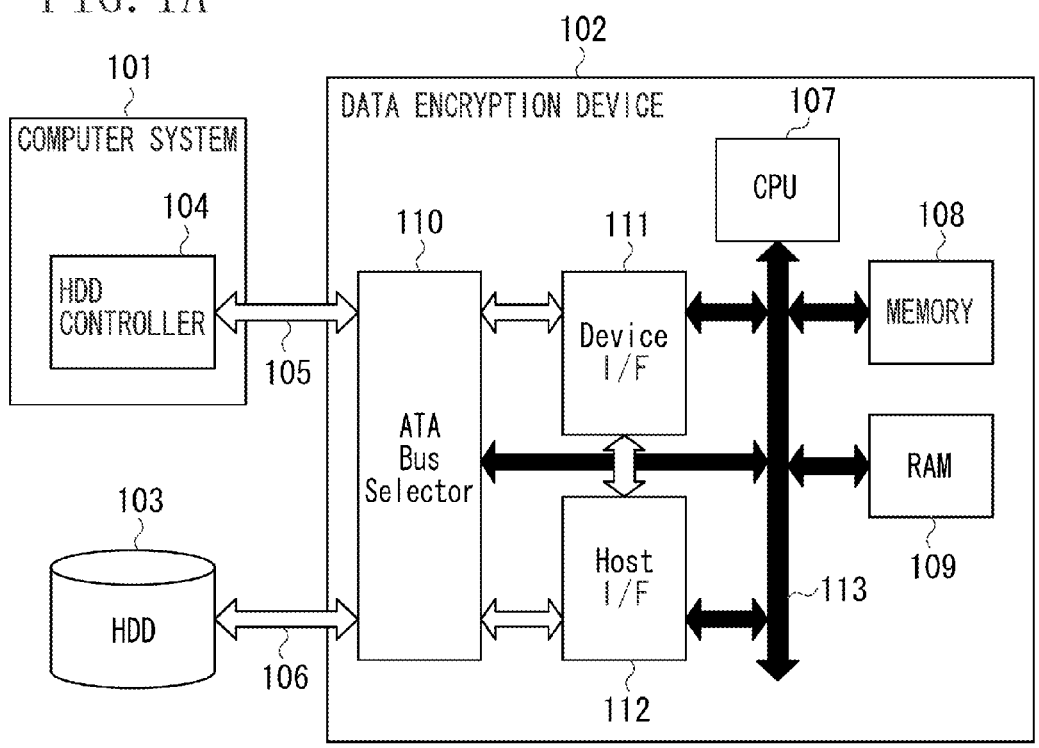
FIGS. 1A and 1B, respectively, illustrate examples of a system of a data encryption device.

FIG. 1A illustrates a system to be applied to the present exemplary embodiment. A system including a computer system 101, a data encryption device 102 as one of data processing apparatuses, and a hard disk drive (HDD) 103 as one of external storage devices is described.

The computer system 101 may be a banking system, a Desk Top Publishing (DTP) system, a Multi Function Peripheral (MFP), and the like, and includes therein a HDD controller 104.

The data encryption device 102 is connected to both of the computer system 101 and the HDD 103 and positioned therebetween. The data encryption device 102 transmits and receives data between the data encryption device 102 and the HDD controller 104. Further, the data encryption device 102 transmits and receives data between the data encryption device 102 and the HDD 103. This data encryption device 102 encrypts the data received from the computer system 101 (i.e., the HDD controller 104), and outputs the encrypted data to the HDD 103.

The data encryption device 102 also decrypts the encrypted data read out from the HDD 103 and outputs the decrypted data to the computer system 101 (i.e., the HDD controller 104). The computer system 101 (i.e., the HDD controller 104) and the HDD 103 do not transmit or receive data directly therebetween. The computer system 101 and the HDD 103 always transmit or receive data therebetween via the data encryption device 102 when they transmit or receive data. The data encryption device 102 is connected to the computer system 101 and the HDD 103 via general purpose interfaces 105 and 106 (e.g., ATA bus interfaces), respectively.

The HDD 103 is an external storage device for storing received data. Instead of the HDD 103, the external storage device may be a rewritable magnetic disc such as a compact disc recordable (CD-R), a compact disc rewritable (CD-RW), a digital versatile disk recordable (DVD-R), and a digital versatile disk rewritable (DVD-RW). In FIG. 1, the HDD 103 is illustrated as an example of the external storage device.

[Data Encryption Device]

An interior configuration of the data encryption device 102 is described below. The CPU 107 controls an entire operation of the data encryption device 102. A memory 108 stores a control program executed by the CPU 107 and various pieces of data. The memory 108 functions as a nonvolatile memory that can store data, e.g., key information, required in the encryption of the data. The desirable memory 108 has a tamper resistance countering against an unauthorized access in order to store the information, e.g., the key information, requiring secrecy thereof.

A random access memory (RAM) 109 is used as a work memory for executing a control program read from the memory 108 by the CPU 107. An ATA Bus Selector 110 is an interface for connecting the HDD controller 104 and the HDD 103. A device interface (Device I/F) 111 is an interface for connecting an address data bus 113 and the HDD controller 104 via the ATA bus selector 110.

A host I/F (Host I/F) 112 is an interface for connecting the HDD 103 and the address data bus 113 via the ATA bus selector 110. The address data bus 113 connects blocks of the data encryption device 102 to each other to enable a control of each block by the CPU 107.

The HDD controller 104 issues a control command for controlling the HDD 103, and the control command issued here is temporarily received by the device I/F 111. Under the control of the CPU 107, the command that is determined as executable is reissued from the host I/F 112 to be sent to the HDD 103.

When the data received from the computer system 101 is stored in the HDD 103, thus received data is subjected to conversion/encryption processing by executing the program stored in the memory 108 by the CPU 107, and the converted data is transmitted to the HDD 103.

When the converted data is read out from the HDD 103 to transmit it to the computer system 101, the converted data is subjected to inverse conversion/decryption processing by executing the program stored in the memory 108 by the CPU 107, and the resultant data is transmitted to the computer system 101. The conversion/encryption processing and the inverse conversion/decryption processing are described below.

Figure 1B:
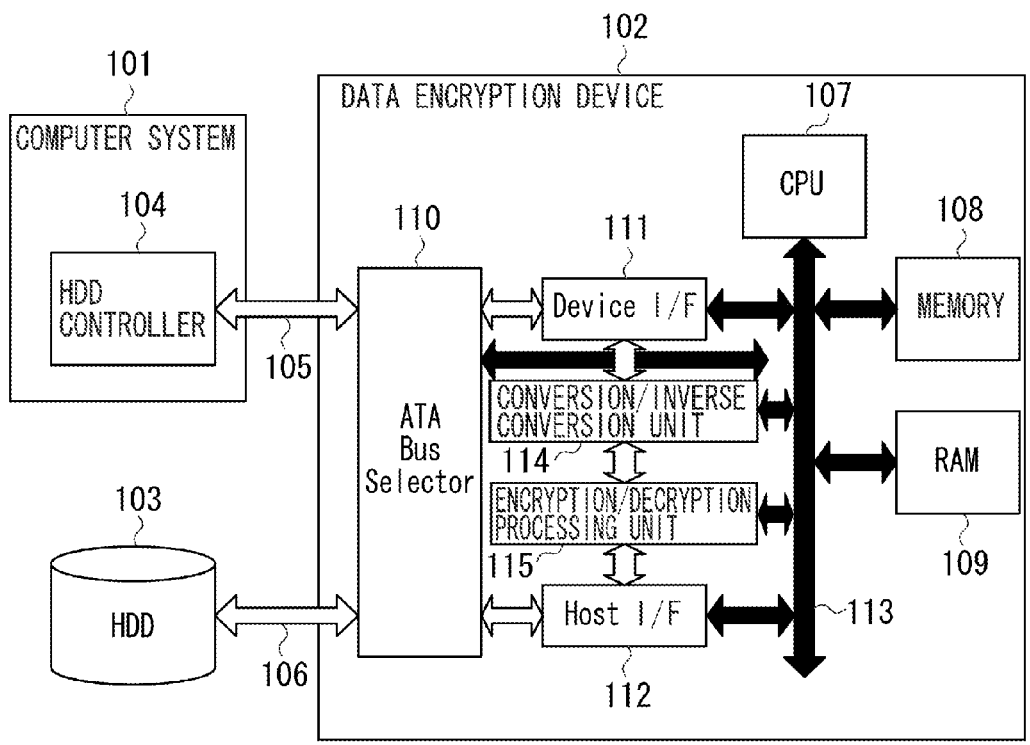

FIG. 1A illustrates a software configuration in which the conversion/inverse conversion processing and the encryption/decryption processing are performed by executing the program stored in the memory 108 by the CPU 107. However, the conversion/inverse conversion processing and the encryption/decryption processing are a heavy load. As illustrated in FIG. 1B, such a hardware configuration may also be employed that a conversion/inverse conversion unit 114 and an encryption/decryption processing unit 115 are provided.

[Operation of Data Encryption Device]

Figure 2:
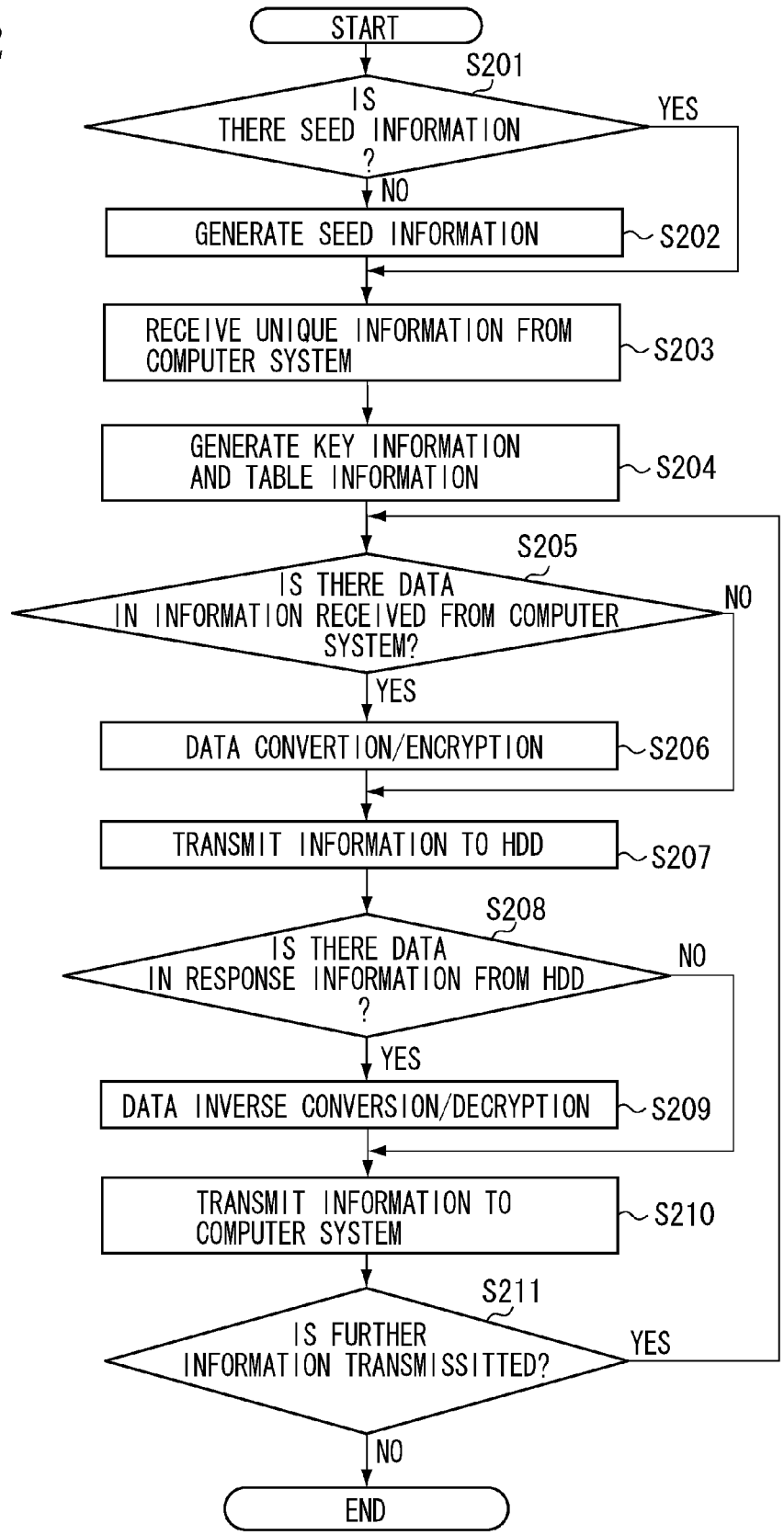
FIG. 2 is a flow chart illustrating an example of control processing.

With reference to FIG. 2, an operation of the data encryption device 102 according to the present exemplary embodiment is described below. FIG. 2 is a flow chart illustrating an example of control processing according to the present exemplary embodiment. The processing of this flow chart is realized by executing the program stored in the memory 108 by the CPU 107. In a case of the configuration of FIG. 1B, the processing is realized by executing the program stored in the memory 108 by the CPU 107, and the conversion/inverse conversion unit 114.

In step S201, the CPU 107 checks a state of presence or absence of seed information stored in the memory 108 of the data encryption device 102, thereby determining whether or not the data encryption device 102 is in an initial state. The "initial state" is a state that the seed information of a key the user uses to generate key information by a key generation function (described below) is stored in the memory 108 and thus the key information can be generated.

A "non-initial state" is a state that the seed information is not stored in the memory 108 and thus the key information cannot be generated. The seed information is the information unique to the data encryption device 102 and cannot be known from a device other than the data encryption device 102.

In a case where the CPU 107 determines that the seed information is not stored in the memory 108, i.e., the date encryption device 102 is in the "initial state" (NO in step S201), the processing proceeds to step S202. In step S202, the CPU 107 newly generates the seed information and stores the resultant seed information in the memory 108. On the other hand, in step S201, in a case where the CPU 107 determines that the seed information is stored in the memory 108, i.e., the date encryption device 102 is in the "non-initial state" (YES in step S201), the processing proceeds to step S203.

In step S203, the CPU 107 receives unique information from the computer system 101. In step S204, the CPU 107 generates the information based on the unique information and the seed information, and further generates table information based on the key information and fixed data. A method for generating the key information and the table information is described below.

In a case where key information checking information is managed as a set in the key information, a correctness of thus generated key information can be checked. In a case where the correctness of the key information cannot be checked, the CPU 107 can also make a determination that the key information is not stored. Therefore, the CPU 107 may control transmission and reception of information between the computer system 101 and the HDD 103 so as to be blocked.

In step S203, the fixed data may be received from the computer system 101 or may be preliminary defined as the fixed data by the data encryption device 102. The fixed data is configured to invalidate the data stored in the HDD 103.

In step S205, the CPU 107 receives information transmitted from the computer system 101 by the control function and determines whether the received information is control information such as a command or the received information is data. In a case where the CPU 107 determines the received information is the data (YES in step S205), the processing proceeds to step S206. In step S206, the data of the information transmitted from the computer system 101 is subjected to the conversion/encryption processing. When the information is determined to be control information of the information transmitted from the computer system 101 (NO in step S205), the processing proceeds to step S207.

Then, in step S207, the control information and conversion data are written into the HDD 103. In step S208, the CPU 107 receives the information (i.e., response information) from the HDD 103 by using the control function, and determines whether the received information is the control information such as the response information or the data. In a case where the CPU 107 determines that the received information is the data (YES in step S208), the processing proceeds to step S209. In step S209, the data of the information is subjected to the inverse conversion/decryption processing.

In a case where the CPU 107 determines that the received data is the control information (NO in step S208), the processing proceeds to step S210.

In step S210, the CPU 107 transmits the control information and the inverse-converted data to the computer system 101.

In step S211, the CPU 107 determines whether further information is transmitted from the computer system 101. In a case where the CPU 107 determines that further information is transmitted (YES in step S211), the processing returns to step S205. In a case where the CPU 107 determines that further information is not transmitted (NO in step S211), the processing is ended.

A method for generating the key information and the table information illustrated in step S204, a method for determining the data of the information and the control information, respectively, illustrated in steps S205 and S208, the conversion processing illustrated in step S206, and the inverse conversion processing illustrated in step S209 are also described below in detail.

[Method for Generating Key Information and Table Information]

Now, a method for generating the key information and the table information illustrated in step S204 of FIG. 2 is described below in detail.

The method for generating the information used in each of the "encryption/decryption processing" and the "conversion/inverse conversion processing", respectively, is described below. The method includes a function for generating the key information used in executing the encryption/decryption processing (i.e., a key generation function) and a function for generating the table information in executing the conversion processing (i.e., a table generation function).

Initially, a description is made as to the key generation function for generating the key information used in the encryption/decryption processing. The key information used in the encryption/decryption processing is the information that can decrypt the data having been encrypted and stored in the HDD 103 if the information is leaked to the third party. Therefore, it is necessary for the key information not to be leaked outside the data encryption device 102.

The data encryption device 102 has therein a key generation function for generating the key information. The data encryption device 102 desirably has a tamper resistant capable of preventing an unauthorized access to a key from the outside.

To realize the key generation function, the data encryption device 102 receives unique information of the computer system 101 (hereinafter, referred to as the "unique information") from the computer system 101. The unique information is unique to the respective computer systems and may be various kinds of information such as a serial number, a MAC address in the computer system having a local area network (LAN) interface (I/F), or information of a combination thereof.

The key generation function generates the key information based on the unique information received from the computer system 101 and the seed information stored in the memory 108. How to generate the seed information depends on how to generate the key information and an encryption algorithm.

In a case where a random number can be used as the key information in the encryption algorithm, the seed information can also be generated as the random number or a pseudo-random number. On the other hand, in a case where information satisfying a specific condition must be used as the key information in the encryption algorithm, it is necessary to generate, for example, the key information and to calculate the seed information satisfying the "key information=f (seed information, unique information)" based on the generated key information and the seed information.

Various methods can be used as the method for generating the key information based on the unique information and the seed information. For example, there is the following method.

(1) A method wherein an exclusive OR of each of the unique information and the seed information is set to be the key information.

(2) A method wherein the unique information and the seed information are input into a one-way hash function, and the output information is set to be the key information.

(3) A method wherein the unique information is set to be a key of an encryption function, the seed information is subjected to the encryption processing, and the output information is set to be the key information.

(4) A method wherein the seed information is set to be a key of the encryption function, the unique information is subjected to the encryption processing, and the output information is set to be the key information.

(5) A method wherein the key information is shared based on the Diffie-Hellman (DH) key sharing method (RFC2631).

The key information may be stored only in the data encryption device 102, so that, for example, the seed information is set to be a secret key of the DH key sharing method of the data encryption device 102 and the unique information is set to be the information obtainable from a public key of the data encryption device 102 and the unique information of the computer system 101.

Each of the above described methods is a mere example of the method for generating the key information based on the unique information and the seed information. The method for generating the key information in the present exemplary embodiment may employ any function as far as it is a two input function $f$ "key information=$f$ (seed information, unique information)". The management of the key information and the key information checking information in a set as the key information enables checking of the correctness of the key information. An example of the key information checking information includes a hash value of the key information.

Now, a table generation function for generating the table information to be used in the conversion processing is described below. The conversion processing serves to finally realize outputting of the predetermined fixed data even in a case where the predetermined fixed data is subjected to the encryption/decryption processing.

FIG. 3A is an example of the table information. The table information includes "pre-conversion data" that is input before the conversion processing and "post-conversion data" that is output after the conversion processing.

The pre-conversion data includes the "fixed data" and "data generated such that the fixed data is subjected to the decryption processing (hereinafter referred to as the "decrypted fixed data")". The decrypted fixed data can be generated by satisfying the "fixed data=Enc (i.e., the decrypted fixed data)" and decrypting the fixed data (i.e., the decrypted fixed data=Dec (fixed data)).

Herein, Dec ( ) means the decryption processing of the encryption/decryption processing and Enc ( ) means the encryption processing of the encryption/decryption processing. This encryption/decryption processing uses the algorithm and the key information identical to those of the encryption/decryption processing according to the present exemplary embodiment. Data "0000 . . . 00" indicates the fixed data and data "ed74 . . . 97" indicates the decrypted fixed data. When the data "ed74 . . . 97" is subjected to the encryption processing, the data "0000 . . . 00" can be acquired.

The post-conversion data that the pre-conversion data corresponds to the "fixed data" is set to the "decrypted fixed data" and the post-conversion data that the pre-conversion data corresponds to the "decrypted fixed data" is set to the "fixed data". The fixed data may be all zero data or all one data required in deletion by overwriting, or may be all "0x55" data or all "0xAA" data including bit one and bit zero alternatively. However, the fixed data is not limited thereto.

FIG. 3B is an example of the table information from which a data amount of the table information of FIG. 3A is decreased. In FIG. 3A, the post-conversion data corresponding to the "fixed data" is the "decrypted fixed data" and the post-conversion data corresponding to the "decrypted fixed data" is the "fixed data".

The table information of FIG. 3B has only values of the "fixed data" and the "decrypted fixed data" and, in a case where the "fixed data" is input in the conversion processing, the "decrypted fixed data" is output, whereas, in a case where the "decrypted fixed data" is input, the "fixed data" is output. Accordingly, the data amount to be stored in the memory 108 can be decreased.

Now, a case where there is a plurality of pieces of fixed data is exemplified. FIG. 3C illustrates the table information in a case where there are two pieces of fixed data. More specifically, FIG. 3C illustrates an example in a case where the fixed data is the all zero data or the all one data, and the respective decrypted fixed data that the fixed data is decrypted is, respectively, the data "ed74 ... 97" and the data "3753 ... 46".

In a system requiring a high secrecy, by using the fixed data and a complement number of the fixed data (for example, the complement number of the all zero data is the all one data), more than two times overwriting is required. As described above, to have two pieces of the fixed data can be used in such a system.

FIG. 3D is an example of the table information from which a data amount of the table information of FIG. 3C is decreased. The table information only has values of two pieces of the "fixed data" and the "decrypted fixed data" corresponding to the "fixed data". In a case where the "fixed data" is input during the conversion processing, the "decrypted fixed data" corresponding to the fixed data is output, whereas, in a case where the "decrypted fixed data" is input, the "fixed data" corresponding to the decrypted fixed data is output.

It is desirable that a fixed data length is set to a cluster (referred also to as an allocation unit or an allocation block) length of the HDD. The cluster is the minimum unit capable of being allocated to a file and a cluster size is determined when a file system is initialized. For example, the size can be determined with an argument of a file format command in a general operating system (OS).

On the other hand, the encryption/decryption processing (described below in detail) is a symmetric-key cryptography method such as an Advanced Encryption Standard (AES). There may be a case that the processing is completed with a single block in a similar manner as an Electronic Code Book (ECB) mode. In this case, the fixed data length can be set to the block length of the symmetric-key cryptography method.

Various lengths are assumed with respect to the data length of the fixed data according to a combination of the number of performances of the overwriting processing. However, as described above, the data length of the fixed data can be determined, as required, according to the file system of the HDD and the encryption/decryption processing.

[Method for Determining Data/Control Information]

Figure 4A:
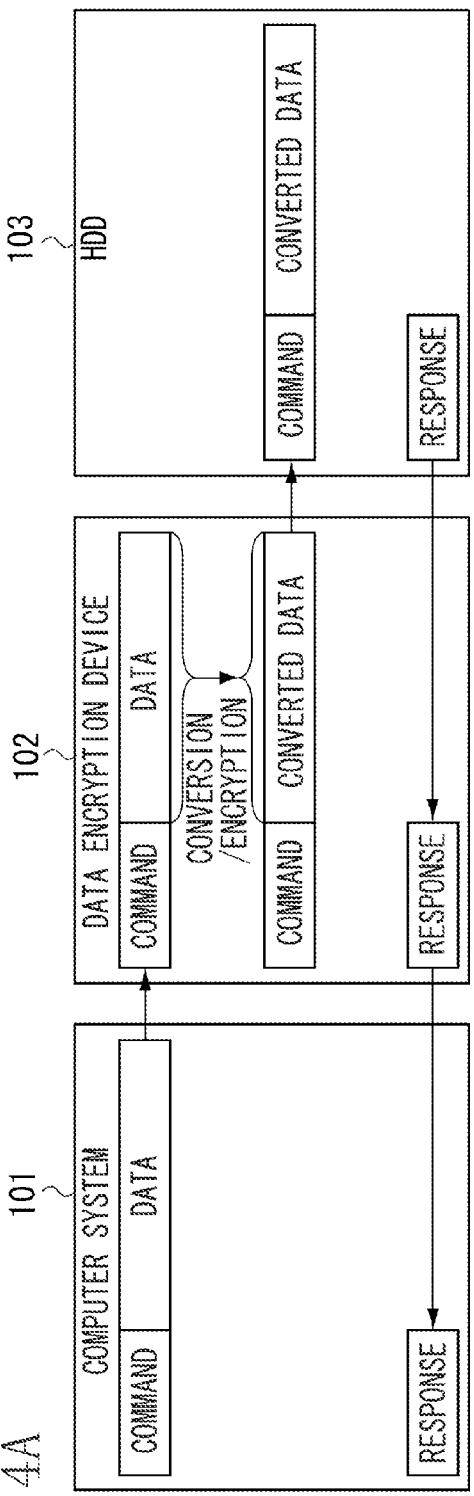
FIGS. 4A and 4B, respectively, illustrate data flows in a case of reading/writing data into a hard disk drive (HDD).
Figure 4B:
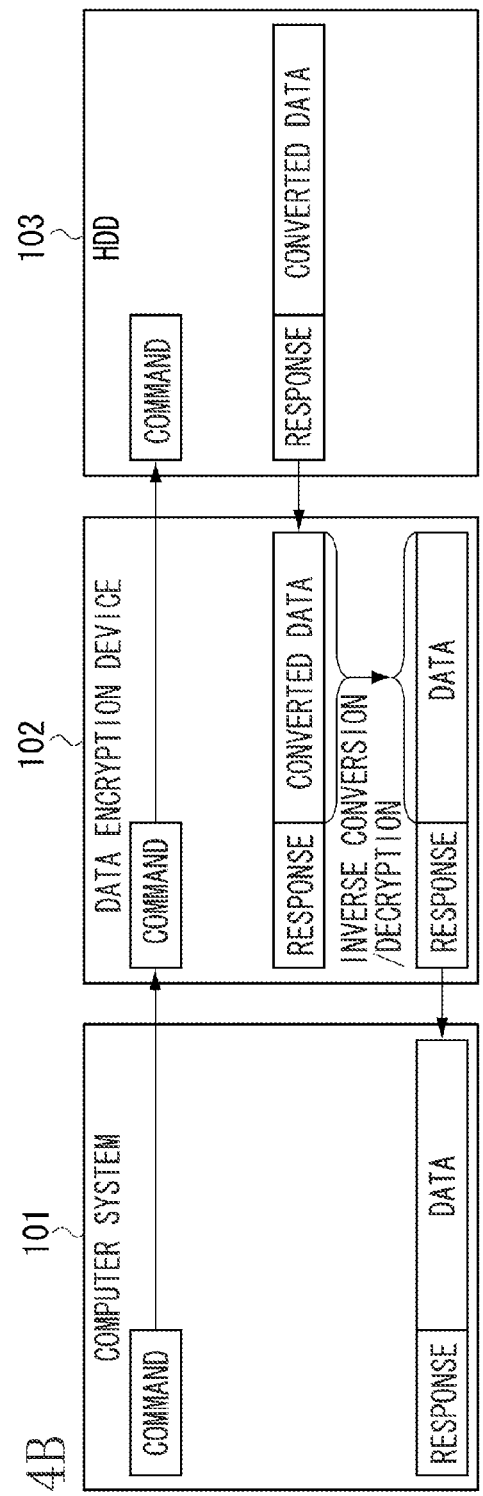

Now, a method for determining the data/control information illustrated in each of steps S205 and S208 of FIG. 2 is described in detail by exemplifying data flows illustrated in FIGS. 4A and 4B.

FIG. 4A illustrates a data flow in a case where the data transmitted from the computer system 101 is written into the HDD 103. As illustrated in FIG. 4A, the CPU 107 receives information including executable "command" and "data" from the computer system 101. The "command" is control information corresponding to a data writing command to the HDD 103 and the "data" is data to be written into the HDD 103. The CPU 107 performs the conversion processing on the "data". The information including a "command" and "conversion data" acquired by the conversion/encryption processing is transmitted to the HDD 103.

Then, the CPU 107 receives from the HDD 103 a "response" transmitted according to the conversion data written into the HDD 103 and transmits the "response" as the control information as it is to the computer system 101.

FIG. 4B illustrates a data flow in a case where the computer system 101 reads the data from the HDD 103. The CPU 107 receives an executable "command" from the computer system 101. The "command" is the control information corresponding to a data reading command from the HDD 103. The CPU 107 transmits the "command" received from the computer system 101 as it is to the HDD 103.

Then, the CPU 107 receives from the HDD 103 the "response" and the "conversion data" transmitted according to the conversion data being read from the HDD 103. The CPU 107 performs the inverse conversion/decryption processing on the "conversion data" read from the HDD 103. The CPU 107 transmits the information including the "response" and the "data" (having been subjected to the inverse conversion/decryption processing) to the computer system 101.

The data flows illustrated in FIGS. 4A and 4B are mere examples. Specific data flows according to a plurality of interfaces depend on a specification of an interface between the computer system 101 and the data encryption device 102, and a specification of an interface between the data encryption device 102 and the HDD 103.

For example, such a data flow is also employable that only the "command" and the "response" are included without the "data". Further, such a case is also employable that the interface between the computer system 101 and the data encryption device 102 differs from the interface between the data encryption device 102 and the HDD 103. In this case, the control function of the CPU 107 can be realized by performing the conversion/inverse conversion processing for the specification of the interface together with the encryption/decryption processing for the data.

As illustrated in FIGS. 4A and 4B, information converted in the data encryption device 102 is the "data". Therefore, in a case where the data encryption device 102 is in the initial state, i.e., does not store the key information, the CPU 107 can limit the information for blocking the transmission between the computer system 101 and the HDD 103 to the "data".

[Detailed Description of Conversion/Encryption Processing and Inverse Conversion/Decryption Processing]

In the present exemplary embodiment, in a case of the conversion/encryption processing, the "conversion processing" and the "encryption processing" are performed in this order, and, in a case of the inverse conversion/decryption processing, the "decryption processing" and the "inverse conversion processing" are performed in this order.

Figure 5A:
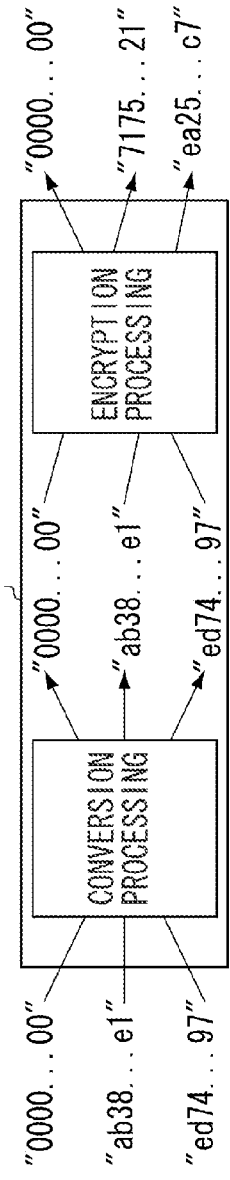
FIGS. 5A, 5B, 5C, and 5D, respectively, illustrate data flows of conversion/encryption processing and inverse conversion/decryption processing.

FIG. 5A illustrates a data flow in the conversion/encryption processing using the table information of FIG. 3A or FIG. 3B. In FIG. 5A, the data "0000 ... 00" indicates the fixed data, the data "ed74 ... 97" indicates the decrypted fixed data that the fixed data is decrypted, and the data "ab38 ... e1" indicates the input data other than the above, respectively. When the data "ed74 ... 97" is encrypted, the data "0000 ... 00" can be acquired.

The "conversion/inverse conversion processing" is conversion processing according to the table information generated by the above described initial value generation function. Data absent in the table information is not converted. In a case of FIG. 5A, the data "0000 . . . 00" is converted into the data "ed74 . . . 97" and the data "ed74 . . . 97" is converted into the data "0000 . . . 00", however, the data "ab38 . . . e1" is output without being converted.

The "encryption/decryption processing" is a versatile encryption processing, for example, the symmetric-key cryptography method such as an Advanced Encryption Standard (AES), a public-key encryption method such as a RSA, or a hybrid method in which the shared key method and the public key method are combined. In a case of FIG. 5A, the data "ed74 . . . 97" is encrypted to output the data "0000 . . . 00", and the data "0000 . . . 00" is encrypted to output the data "7175 . . . 21".

Therefore, in an example of FIG. 5A, in a case where the data "0000 . . . 00" is input, the input data is subjected to the "conversion processing" and the "encryption processing" to output the data "0000 . . . 00". As a result thereof, even if the encryption processing performed, a predetermined fixed data can be output.

In an example of FIG. 5A, in a case where the data "ed74 . . . 97" is input, the input data is subjected to the "conversion processing" and the "encryption processing" to output the data "7175 . . . 21". In other words, in a case where the data "ed74 . . . 97" is encrypted, the fixed data "0000 . . . 00" can be acquired. However, by performing the conversion processing, data other than the predetermined fixed data is output even if the encryption processing is performed.

In a case where the data "ed74 . . . 97" is input, the data "7175 . . . 21" acquired by encrypting the fixed data is output. Therefore, the following effects can be produced. Namely, an affect is eliminated with respect to data other than the fixed data and the decrypted fixed data and data acquired by encrypting the data. Also, these pieces of data are encrypted as they are to be output.

Figure 5B:
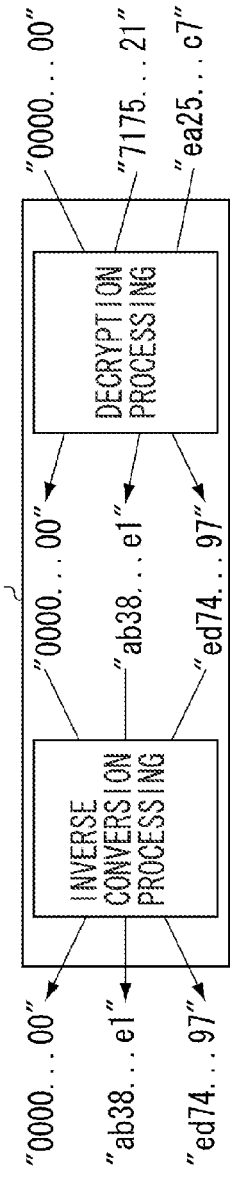

FIG. 5B illustrates a data flow in the inverse conversion/decryption processing using the table information of FIG. 3A or FIG. 3B, and a case where the data converted in FIG. 5A is subjected to the inverse conversion processing. In an example of FIG. 5B, in a case where the data "0000 . . . 00" is input, the input data is subjected to the "decryption processing" and the "inverse conversion processing" to output the data "0000 . . . 00". As a result thereof, even if the decryption processing is performed, the predetermined fixed data can be output.

Figure 6A:
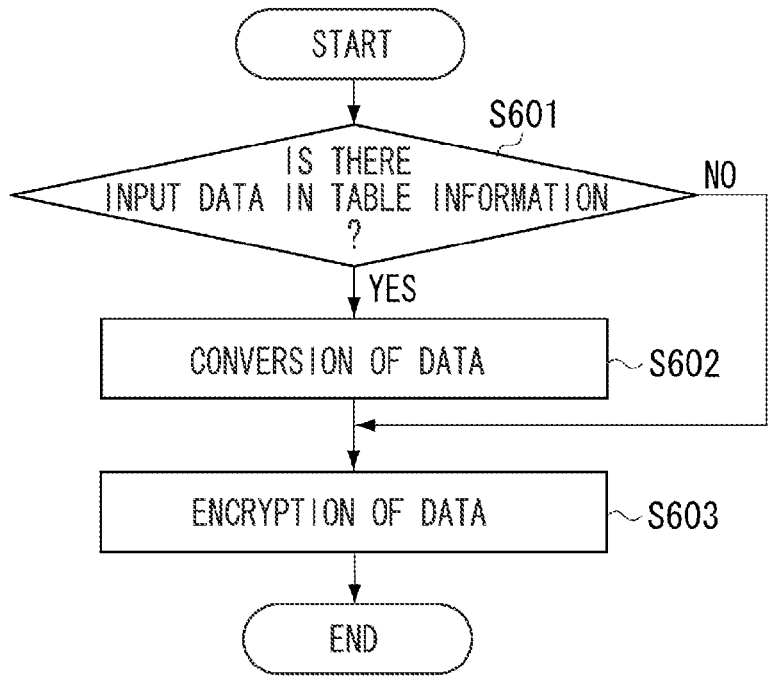
FIGS. 6A and 6B, respectively, are flow charts illustrating conversion/encryption processing and inverse conversion/decryption processing according to a first exemplary embodiment.
Figure 6B:
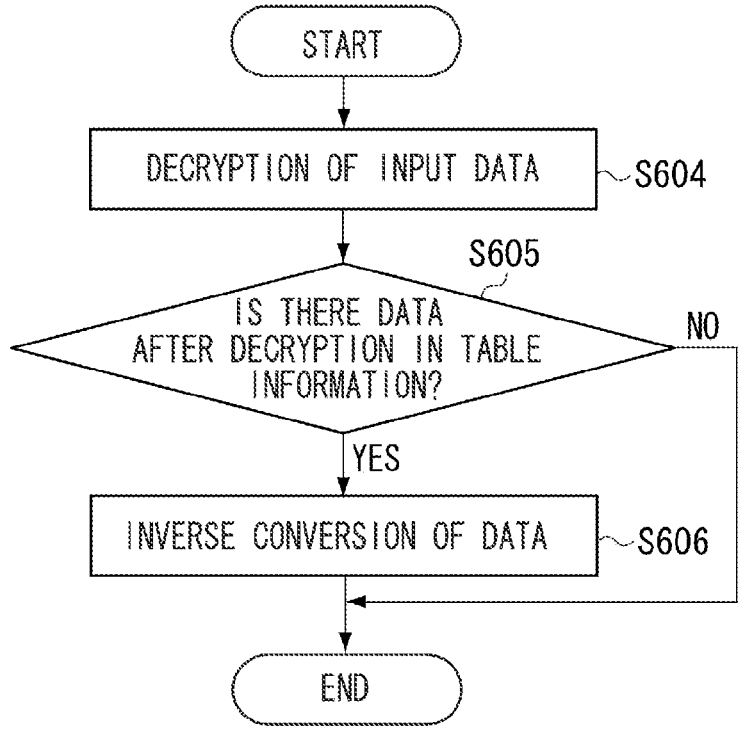

With reference to FIGS. 6A and 6B, an operation of the data encryption device 102 according to the present exemplary embodiment is described below. FIG. 6A is a flow chart illustrating an example of the conversion/encryption processing according to the present exemplary embodiment. FIG. 6B is a flow chart illustrating an example of the inverse conversion/decryption processing according to the present exemplary embodiment. With reference to FIG. 6A, when the data is stored in the HDD 103 from the computer system 101, an operation of the conversion/encryption processing performed in the data encryption device 102 is described below.

In step S601, whether or not the data input from the computer system 101 to the data encryption device 102 is contained in the "pre-conversion data" in the table information stored in the memory 108, is searched. In a case where the data input in step S601 is not contained in the table information (NO in step S601), the processing proceeds to step S603. In the example of FIG. 5A, in a case where the input data is the data "ab38 . . . e1" that is neither the fixed data nor the decrypted fixed data, the processing proceeds to step S603.

In a case where the data input in step S601 is contained in the table information (YES in step S601), in step S602, the conversion processing is performed to convert the input data, and then the processing proceeds to step S603. In the example of FIG. 5A, in a case where the input data is the data "0000 . . . 00", the data is converted into the data "ed74 . . . 97" to be output. In a case where the input data is the data "ed74 . . . 97", the input data is converted into the data "0000 . . . 00" to be output.

In step S603, the encryption processing is performed based on the above described key information, thereby generating the conversion data. The processing performed in each of step S601 and step S602 can be realized only by the conversion processing. The processing can be realized by adding to the above described table information the other data provided that the "pre-conversion data" is identical to the "post-conversion data".

Then, with reference to FIG. 6B, an operation of the inverse conversion/decryption processing performed by the data encryption device 102 when the data is read from the HDD 103 to the computer system 101 is described below.

In step S604, the data input from the HDD 103 is decrypted based on the key information generated by the above described initial value generation function, and the processing proceeds to step S605. In step S605, whether or not the decrypted data is contained in the "post-conversion data" in the table information is searched. In a case where the data decrypted in step S605 is not contained in the table information (NO in step S605), the decrypted data is output to the computer system 101.

In a case where the decrypted data is contained in the table information (YES in step S605), in step S606, the data is subjected to the inverse conversion processing and the data after being subjected to the inverse conversion processing is output to the computer system 101. In the example of FIG. 5B, in a case where the decrypted data is the data "ed74 . . . 97", the data is converted into the data "0000 . . . 00" to be output. In a case where the decrypted data is the data "0000 . . . 00", the data is converted into the data "ed74 . . . 97" to be output.

Similar to the conversion processing, the processing of step S605 and the step S606 can be realized only by the inverse conversion processing. The processing can be realized by adding into the above described table information the other data provided that the "pre-conversion data" is identical to the "post-conversion data".

As described above, according to the present exemplary embodiment, the data encryption device 102 is configured to connect the computer system 101 and the HDD 103 via the interface, and to encrypt the data to be written into the HDD 103 under the control of the CPU 107. In the present exemplary embodiment, with this configuration, the secrecy of the data to be stored in the HDD 103 can be kept.

In the present exemplary embodiment, the "encryption/decryption processing" and the "conversion/inverse conversion processing" are combined and, in a case of the predetermined fixed data, the data is subjected to the encryption processing after the data is subjected to the conversion/inverse conversion processing for canceling the encryption processing. Accordingly, such an operation can be realized that the predetermined fixed data required in the overwriting delete processing or the like (e.g., data for invalidating the data such as all zero data or all one data) is written into the HDD 103.

In the present exemplary embodiment, an example of using the table information is described. However, the fixed data and data acquired by decrypting the fixed data are stored in the memory 108 without using the table information and whether or not the stored data is the data stored in step S601 and step S605 may be determined.

The key information is generated based on the unique information of the computer system 101 and the seed information unique to the data encryption device 102. Therefore, correct key information cannot be generated based on the different combination of the computer system 101 and the data encryption device 102.

Before receiving the unique information of the computer system 101, a two-way authentication or a one-way authentication may be performed between the computer system 101 and the data encryption device 102.

Examples of the authentication method include "a method for mutually confirming preliminary shared secret information (i.e., a password)", "a method for dialogically authenticating a challenge response based on preliminary shared secret information", or the like. With these methods, the data encryption device 102 can realize a reception of the unique information of the correct computer system.

Further, the data encryption device 102 can perform communications with the HDD controller 104 and the HDD 103, and all the transmission and reception of the data via the standard interfaces, and thus no additional signal lines are required.

That is, a specification of the external storage device, e.g., the computer system 101 and the HDD 103, is not required to be changed. Therefore, such an effect can be produced that a data encryption storage system capable of highly keeping the secrecy of the storage data of the HDD 103 can be constituted with a low cost without changing a specification of the existing computer system and external storage device.

In the first exemplary embodiment, in a case of the conversion/encryption processing, the "conversion processing" and the "encryption processing" are performed in this order, whereas, in a case of the inverse conversion/decryption processing, the "decryption processing" and the "inverse conversion processing" are performed in this order. In the second exemplary embodiment, in a case of the conversion/encryption processing, the "encryption processing" and the "conversion processing" are performed in this order, whereas, in a case of the "inverse conversion/decryption processing, the "inverse conversion processing" and the "decryption processing" are performed in this order.

The second exemplary embodiment is identical to the first exemplary embodiment other than the conversion/encryption processing and the inverse conversion/decryption processing. A "method for generating the key information and the table information" and a "detailed description of the conversion/encryption processing and the inverse conversion/decryption processing" different from those in the first exemplary embodiment are described below.

[Method for Generating Key Information and Table Information]

A method for generating the respective pieces of the information used in the "encryption/decryption processing" and the "conversion/inverse conversion processing" is described below. The method includes a function for generating the key information to be used in performing the encryption/decryption processing (i.e., a key generation function) and a function for generating the table information to be used in performing the conversion/inverse conversion processing (i.e., a table generation function).

The key generation function is identical to that of the first exemplary embodiment, so that the description thereof is omitted here. A table generation function is described below.

The conversion processing is processing for realizing the operation that a predetermined fixed data is finally output even in a case where the predetermined fixed data is subjected to the encryption processing.

FIG. 3E illustrates an example of the table information. The table information includes the pre-conversion data and the post-conversion data. The pre-conversion data includes the "fixed data" and the "encrypted fixed data". The encrypted fixed data satisfies the "encrypted fixed data=Enc (fixed data)". Enc ( ) means the encryption of the encryption/decryption processing. In this encryption/decryption processing, the algorithm and the key information identical to those in the encryption/decryption processing of the present exemplary embodiment are used.

The fixed data is the all zero data or all one data required in the overwriting deletion or the like. However, the fixed data is not limited to the above. The encrypted fixed data can be generated by encrypting the fixed data (i.e., encrypted fixed data=Enc (fixed data)) based on the key information generated by the above described key generation function.

The post-conversion data corresponding to the fixed data is the "encrypted fixed data" and the post-conversion data corresponding to the encrypted fixed data is the "fixed data". The data "0000 . . . 00" is the fixed data and the data "7175 . . . 21" acquired by encrypting the fixed data is set to be the encrypted fixed data.

FIG. 3F illustrates an example in which an amount of the table information is decreased without dividing the table information into the pre-conversion data and the post-conversion data. One piece of fixed data is exemplified here, however, there may be a plurality of pieces of fixed data in a similar manner as the first exemplary embodiment.

[Detailed Description of Conversion/Encryption Processing and Inverse Conversion/Decryption Processing]

Figure 5C:
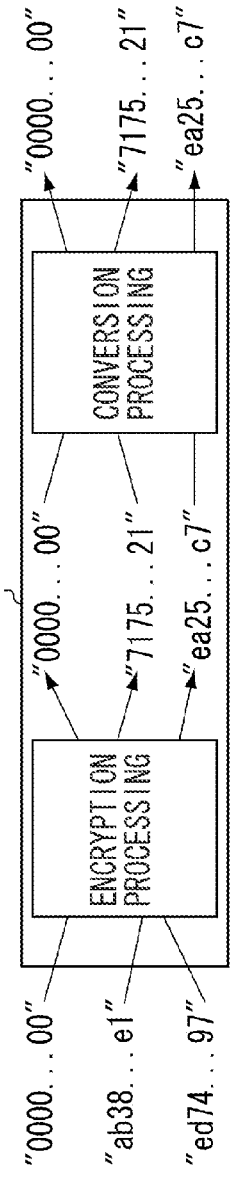
Figure 5D:
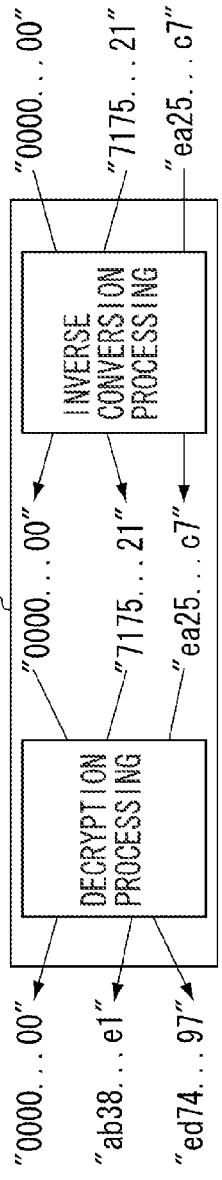

FIG. 5C illustrates a data flow in the conversion/encryption processing. FIG. 5D illustrates a data flow in the inverse conversion/decryption processing. In FIG. 5C, the data "0000 . . . 00" indicates the fixed data, the data "ed74 . . . 97" indicates the decrypted fixed data, and the data "7175 . . . 21" indicates the encrypted fixed data, respectively. The data "ab38 . . . e1" indicates the other input data and the data "ea25 . . . c7" indicates the other encrypted input data, respectively. The decrypted fixed data satisfies "encrypted fixed data=Enc (decrypted fixed data)" and the other encrypted input data satisfies "the other encrypted input data=Enc (input data)", respectively.

The "encryption/decryption processing" is the versatile encryption processing, for example, a symmetric-key cryptography method such as an Advanced Encryption Standard (AES), a public key encryption method such as an RSA, or a hybrid method such as a combination of the shared key method and the public key method. The conversion/inverse conversion processing" is performed according to the table information generated by the above described initial value generation function. The data conversion is not performed with respect to data absent in the table information.

Figure 7A:
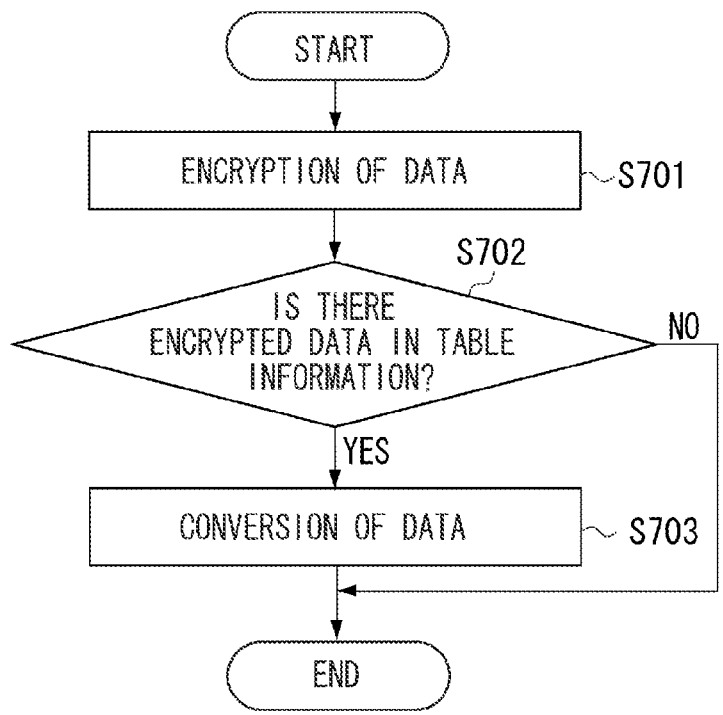
FIGS. 7A and 7B, respectively, are flow charts illustrating conversion/encryption processing and inverse conversion/decryption processing according to a second exemplary embodiment.
Figure 7B:
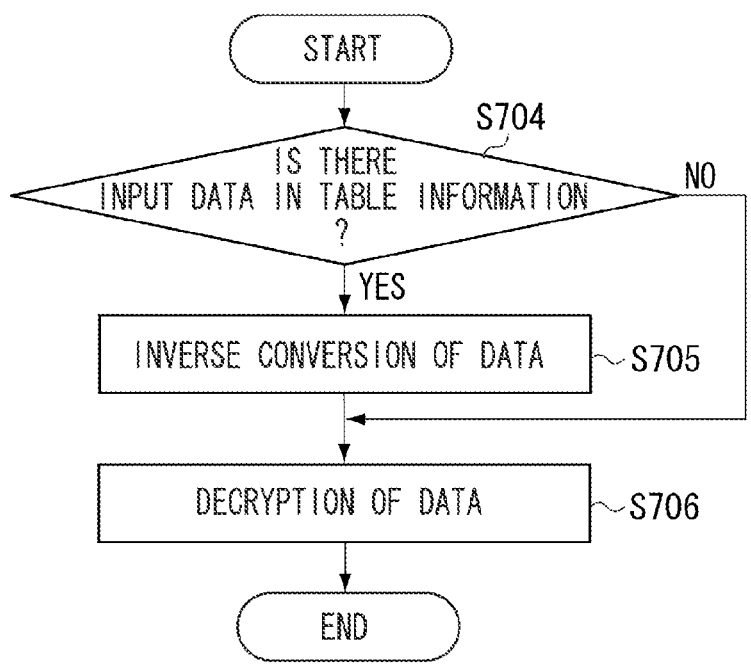

With reference to FIGS. 7A and 7B, an operation of the data encryption device 102 according to the present exemplary embodiment is described below. FIG. 7A is a flow chart illustrating an example of the conversion/encryption processing according to the present exemplary embodiment. FIG. 7B is a flow chart illustrating an example of the inverse conversion/decryption processing according to the present exemplary embodiment. In FIGS. 7A and 7B, steps S701 through S703 and steps S704 through S706 illustrate the respective steps.

With reference to FIG. 7A, an operation in the conversion/encryption processing is described below. In step S701, based on the key information generated by the above described initial value generation function, the input data input from the computer system 101 to the data encryption device 102 is encrypted and the processing proceeds to step S702.

In step S702, the data encryption device 102 searches whether or not the encrypted data is contained in the "pre-conversion data" in the table information of the FIG. 3E. In a case where the encrypted data is not contained in the table information in step S702 (NO in step S702), the encrypted data is output as it is to the HDD 103 as the post-conversion data. In a case where the encrypted data is contained in the table information in step S702 (YES in step S702), in step S703, the encrypted data is converted, and the converted data is output to the HDD 103 as the post-conversion data.

In FIG. 5C, in a case where the encrypted data is the data "0000 . . . 00", the data is converted into the data "7175 . . . 21" to be output, whereas, in a case where the encrypted data is the data "7175 . . . 21", the data is converted into the data "0000 . . . 00" to be output.

The processing of step S702 and step S703 can be realized only by the conversion processing. The processing can be realized by adding the other data to the above described table information provided that the "pre-conversion data" is identical to the "post-conversion data".

Now, with reference to FIG. 7B, an operation of the inverse conversion/decryption processing is described below. In step S704, the data encryption device 102 searches whether or not the data input to the data encryption device 102 from the HDD 103 is contained in the "post-conversion data" in the table information of FIG. 3E.

In step S704, in a case where the data is not contained in the table information (NO in step S704), the processing proceeds to step S706. In step S704, in a case where the data is contained in the table information (YES in step S704), in step S705, the inverse conversion processing is performed to subject the input data to the inverse conversion processing, and the processing proceeds to step S706.

In FIG. 5D, in a case where the input data is the data "7175 . . . 21", the input data is converted into the data "0000 . . . 00" to be output, whereas, in a case where the input data is the data "0000 . . . 00", the input data is converted into the data "7175 . . . 21" to be output.

In step S706, the decryption processing is performed based on the key information generated by the above described initial value generation function, and the decrypted data is output to the computer system 101 as the post-conversion data. The processing of step S704 and step S705 can also be realized only by the inverse conversion processing. The processing can be realized by adding the other data to the above described table information provided that the "pre-conversion data" is identical to the "post-conversion data".

As described above, the present exemplary embodiment is directed to the data encryption device 102 for connecting the computer system 101 and the HDD 103 via the interface and for converting, i.e., encrypting, the data to be written into the HDD 103 in the encryption/decryption unit under the control of the CPU 107. In the present exemplary embodiment, with the above configuration, the secrecy of the data to be stored in the HDD 103 can be secured.

In the present exemplary embodiment, the "encryption/decryption processing" and the "conversion/inverse conversion processing" are combined and, in a case where the data is the predetermined fixed data, the data is subjected to the encryption processing, and thereafter subjected to the conversion processing in order to cancel the encryption processing. Accordingly, writing the predetermined fixed data (e.g., all zero data or all one data) to be required in the overwriting deletion or the like into the HDD 103 can be realized.

In the present exemplary embodiment, an example of using the table information is exemplified. However, without using the table information, the fixed data and the data generated such that the fixed data is encrypted may be stored in the memory 108 and, in step S702 and step S704, the CPU 107 determines whether the data is thus stored data.

Exemplary embodiments are described above, however, the present invention may be embodied as the exemplary embodiment such as a system, a device, a method, a program, or a storage medium. More specifically, the present invention may be applied to a system, including a plurality of devices or may be applied to an apparatus including a single device. Especially, the present invention may be applied to an apparatus including a single device configured by a combination of the computer system and the data encryption device.

A storage medium that stores a program code of software for realizing a function of the above described exemplary embodiment is supplied to the system or the apparatus. To read and execute the program code stored in the storage medium by a computer (or a CPU or a MPU) of the system or the apparatus, as a matter of course, can also achieve the purpose of the present invention.

In this case, the program code itself read out from the storage medium realizes a new function of the present invention and therefore, the storage medium storing the program code is also included in the present invention.

Therefore, any storage medium can be employed, as far as the storage device has a function of the program, such as an object code, a program executed by an interpreter and script data to be supplied to the OS.

Examples of the storage medium for supplying the program include a flexible disk, a hard disk, an optical disk, a magnetic optical disk, a magnetooptic disk (MO), a compact disk read only memory (CD-ROM), a compact disk readable (CD-R), a compact disk rewritable (CD-RW), a magnetic tape, a non-volatile memory card, a read only memory (ROM), and a digital versatile disk (DVD). In this case, the program code itself read out from the storage medium comes to realize the function of the above described exemplary embodiment and therefore, the storage medium storing the program code is also included in the present invention.

In addition to the above described method for supplying the program, the program also can be supplied such that a storage medium is connected to a home page of the internet by using a browser of a client computer and the program of the present invention itself is downloaded from the home page to the storage medium such as a hard disk. The program also can be supplied by causing a file that is compressed and includes an auto-installation function is downloaded to the storage medium such as a hard disk from the home page.

Further, the program can be supplied such that the program code included in the program of the present invention is divided into a plurality of files and each of the files is downloaded from different home pages. In other words, a WWW server, a FTP server, and the like for causing a plurality of users to download the program files that causes the computer to realize the functional processing of the present invention are also encompassed within the scope of the present invention.

The program of the present invention is encrypted to be stored in the storage medium such as a CD-ROM and the program is distributed to the user. Further, the user who cleared a predetermined condition is caused to download the key information for breaking the encryption of the data from the home page via the internet. Further, the use of the key information executes the encrypted program to install the program into the computer, thereby realizing the program.

Such a case is also encompassed within the present invention that execution of the program code read by the computer realizes the function of the above described exemplary embodiment and, as a matter of course, the following configuration is also encompassed within the present invention. For example, as a matter of course, such a configuration is also encompassed within the present invention that, based on an instruction of the program code, an operating system (OS) or the like working on the computer performs a part of or an entirety of the actual processing and the function of the above described exemplary embodiment is realized by the processing.

The program code read out from the storage medium is written into a memory included in a function expansion board inserted into the computer or a function expansion unit connected to the computer. such a case is, as a matter of course, also encompassed within the present invention that, based on the instruction of the program code written into the memory, a CPU or the like included in the function expansion board or the function expansion unit performs a part of or an entirety of the actual processing and the processing enables to realize the function of the above described exemplary embodiment.

As described above, according to the present exemplary embodiments, such an effect is produced that the security of a connection between the storage device and the computer system for controlling the storage device and the security of the data transmitted between the storage device and the control device are appropriately secured. Such an effect also can be produced that the data of the external storage device that is no longer necessary can be correctly deleted.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-121772 filed May 27, 2010, which is hereby incorporated by reference herein in its entirety.

What is claimed is:

1. A data encryption device comprising:
    at least one processor coupled via a bus to a memory, the processor being programmed to control one or more of:
    a key generating application configured to generate key information for encrypting and decrypting data;
    a table generation application configured to generate table information including pre-conversion data input before conversion processing and post-conversion data output after conversion processing;
    a determination application configured to determine whether first data for invalidating data is input or second data is input;
    a conversion application configured to perform conversion processing by converting input data, wherein in a case where the first data for invalidating data is input, the first data is converted into the second data, and in a case where the second data is input, the second data is converted into the first data; and
    an encryption application configured to search whether encrypted data is contained in the pre-conversion data in the table information and, when encrypted data is not contained in the pre-conversion data in the table information, output the encrypted data to a storage unit, and, when encrypted data is contained in the pre-conversion data in the table information the conversion application converts the encrypted data and the encryption application outputs the converted data to the storage unit;
    wherein, the second data is data obtained by decrypting the first data by an encryption algorithm of the encryption application such that in a case where the first data for invalidating data is input in the conversion application, the first data is output to the storage unit even after the conversion by the conversion application and the encryption by the encryption application are performed, and
    wherein, in a case where third data different from the first data and the second data is input, the conversion application outputs the third data to the encryption application without converting the third data.

2. The data encryption device according to claim 1, wherein the storage unit is an external storage device.

3. A data encryption device comprising:
    at least one processor coupled via a bus to a memory, the processor being programmed to control one or more of:
    a key generating application configured to generate key information for encrypting and decrypting data;
    a table generation application configured to generate table information including pre-conversion data input before conversion processing and post-conversion data output after conversion processing;
    a determination application configured to determine whether first data for invalidating data is input or second data is input; and
    an encryption application configured to search whether encrypted data is contained in the pre-conversion data in the table information and, when encrypted data is not contained in the pre-conversion data in the table information, output the encrypted data to a storage unit, and, when encrypted data is contained in the pre-conversion data in the table information a conversion application converts the encrypted data and the encryption application outputs the converted data to the storage unit;
    wherein the conversion application is configured to perform conversion processing by converting the encrypted data and output converted data to the storage unit, wherein in a case where the second data is input, the second data is converted into the first data for invalidating data, and the first data is input, the first data is converted into the second data,
    wherein, the second data is data obtained by decrypting the first data by an encryption algorithm of the encryption application such that in a case where the second data is input in the conversion application, the first data is output to the storage unit even after the encryption by the encryption application and the conversion by the conversion application are performed, and
    wherein, in a case where third data different from the first data and the second data is input, the conversion application outputs the third data to the encryption application without converting the third data.

4. The data encryption device according to claim 3, wherein the storage unit is an external storage device.

5. A data decryption apparatus comprising:
at least one processor coupled via a bus to a memory, the processor being programmed to control one or more of:
a key generating application configured to generate key information for encrypting and decrypting data;
a table generation application configured to generate table information including pre-conversion data input before conversion processing and post-conversion data output after conversion processing;
a determination application configured to determine whether first data for invalidating data is input or second data is input;
a decryption application configured to decrypt data stored in a storage unit;
a conversion application configured to perform conversion processing by converting the decrypted data, wherein in a case where the second data is input, the second data is converted into the first data for invalidating data, and the first data is input, the first data is converted into the second data, and
an encryption application configured to search whether encrypted data is contained in the pre-conversion data in the table information and, when encrypted data is not contained in the pre-conversion data in the table information, output the encrypted data to the storage unit, and, when encrypted data is contained in the pre-conversion data in the table information the conversion application converts the encrypted data and the encryption application outputs the converted data to the storage unit;
wherein, the second data is data obtained by encrypting the first data by an encryption algorithm of the decryption application such that in a case where the second data is input in the conversion application, the first data is output to the storage unit even after the decryption by the decryption application and the conversion by the conversion application are performed, and
wherein, in a case where third data different from the first data and the second data is input, the conversion application outputs the third data to the encryption application without converting the third data.

6. A data decryption device comprising:
at least one processor coupled via a bus to a memory, the processor being programmed to control one or more of:
a key generating application configured to generate key information for encrypting and decrypting data;
a table generation application configured to generate table information including pre-conversion data input before conversion processing and post-conversion data output after conversion processing;
a determination application configured to determine whether first data for invalidating data is input or second data is input;
a conversion application configured to perform conversion processing by converting encrypted data stored in a storage unit, wherein in a case where the first data for invalidating data is input, the first data is converted into the second data, and in a case where the second data is input, the second data is converted into the first data;
an encryption application configured to search whether encrypted data is contained in the pre-conversion data in the table information and, when encrypted data is not contained in the pre-conversion data in the table information, output the encrypted data to the storage unit, and, when encrypted data is contained in the pre-conversion data in the table information the conversion application converts the encrypted data and the encryption application outputs the converted data to the storage unit; and
a decryption application configured to decrypt the converted data,
wherein, the second data is data obtained by encrypting the first data by an encryption algorithm of the decryption application such that in a case where the first data for invalidating data is input in the conversion application, the first data is output to the storage unit even after the conversion by the conversion application and the decryption by the decryption application are performed, and
wherein, in a case where third data different from the first data and the second data is input, the conversion application outputs the third data to the encryption application without converting the third data.

* * * * *